United States Patent [19]

Watson et al.

[11] 4,088,016
[45] May 9, 1978

[54] METHOD AND APPARATUS FOR DETERMINING PARAMETERS OF A STAPLE LENGTH DISTRIBUTION OF FIBERS IN YARN SLIVERS

[75] Inventors: Robert L. Watson, Kingsport; Donald L. Finley, Mt. Carmel, both of Tenn.

[73] Assignee: Eastman Kodak Company, Rochester, N.Y.

[21] Appl. No.: 814,563

[22] Filed: Jul. 11, 1977

[51] Int. Cl.² .......................... G01L 5/04; D01H 5/44
[52] U.S. Cl. ......................................... 73/160; 19/261
[58] Field of Search ................. 73/159, 160; 57/34 R, 57/36, 38.3; 19/260, 261

[56] References Cited

U.S. PATENT DOCUMENTS

| | | | |
|---|---|---|---|
| 1,130,880 | 3/1915 | Blackwood | 19/261 X |
| 2,885,740 | 5/1959 | Thompson et al. | 19/261 |
| 3,354,711 | 11/1967 | Sevey | 73/160 X |

*Primary Examiner*—Richard C. Queisser
*Assistant Examiner*—Chalres Gorenstein
*Attorney, Agent, or Firm*—Malcolm G. Dunn; Daniel B. Reece, III

[57] ABSTRACT

Improved method, and apparatus for practicing the method, for determining parameters of a staple length distribution of fibers in a yarn sliver by feeding the yarn sliver to and between two pairs of drafting rolls initially spaced apart at a greater distance than the longest fiber in the yarn sliver and monitoring the drafting force exerted upon the yarn sliver while continuously decreasing the distance between the pairs of drafting rolls and monitoring the distance, and generating signals representative of the drafting force and distance and feeding them, respectively, to the Y-axis and X-axis of a X-Y recorder and drawing a curve therefrom from which the desired parameters can be determined.

7 Claims, 5 Drawing Figures

METHOD AND APPARATUS FOR DETERMINING PARAMETERS OF A STAPLE LENGTH DISTRIBUTION OF FIBERS IN YARN SLIVERS

BACKGROUND OF THE INVENTION

This invention is directed to an improved method and apparatus for practicing the method by which certain parameters of a staple length distribution of fibers in a yarn sliver can be determined, such as average effective staple length, coefficient of variation of fiber lengths, index of length uniformity, span lengths, and any other well-known statistical parameter of a fiber length distribution.

Both the average filament length and the range of filament lengths, for instance, are important parameters in the processing of staple yarns. Filament lengths are especially important during the sliver drafting operations by fiber processors. If a sliver yarn should contain filaments longer than the distance between the nips of drafting roll pairs in a fiber processing plant, the gap between the drafting roll pairs will be bridged and result in defects known as cockled yarn and tied filaments. Conversely, if the filaments should be too short, the drafted yarn will have thick and thin places resulting in lower uniformity (i.e., high Uster percentage coefficient of variation).

The term "staple length" has taken on many meanings in the textile industry. "True staple length" is commonly referred to as the average filament length after all crimp has been removed from the filaments. "Effective staple length", as will be referred to herein, is the filament length with most of the crimp still in the filaments. Obviously, for a crimped fiber, the effective staple length must always be less than the true staple length.

An object of the present invention, therefore, is to provide a method and an apparatus for practice of the method by which, for example, measurements of the effective staple length can be made under dynamic conditions; "dynamic conditions" being here those conditions encountered in the drafting of yarn slivers by a fiber processor who, upon knowing average "effective staple length", will be able to choose which yarn he will run on which position or to change the distance settings between drafting roll pairs to suit the particular effective staple length.

In the prior art there are at present two methods commonly used to measure "staple length" or at least some parameter related to the staple length. The first of these methods is the "hand array". This method involves manually removing a certain number of single filaments, pulling the crimp from each filament by using tweezers, and carefully measuring the length of each filament with a ruler. The individual values are then averaged. Obviously, this method is very time consuming. Also, due to the necessarily small number of filaments measured, it is difficult to obtain a statistically significant sample. Further, the length parameter, which determines processability of the fiber, is not the actual filament length but rather the effective staple length, the parameter which can be measured by the present invention. Thus, if the crimp level and/or cohesion forces change significantly, the effective staple length can change although the true staple length remains the same.

The second method commonly used to measure staple length is by means of the Fibrograph (See Spinlab Corp., "Measures of Fiber Length — The Fibrogram Method", Information Bulletin 103, October, 1975). The Fibrograph is an instrument used to measure "fiber extension distances (spun lengths) of fibers in the test specimen". The test specimen used in the Fibrograph is a "beard" of fibers formed by clamping and firmly holding in place the fibers of a cross-section or sliver, roving, etc. After all the loose fibers have been combed from the beard, a light source-photocell scan is made along the length of the beard. The resulting transmitted light intensity versus distance along the beard yields a "fibrogram" similar in shape to that obtained with the present invention. The fiber length parameter measured with the Fibrograph is the "span length", which is defined as the distance from the test specimen clamp line to a point where only a certain percentage of the clamped fibers extend.

There are at least three distinct differences that may be observed between the Fibrograph method and the present invention. First, the Fibrograph looks at only a single cross-section of a sliver per test. The present invention, on the other hand, measures the average staple length along a length (typically 3 feet) of yarn sliver. Second, the Fibrograph measures fiber length properties while the fibers are in a combed-out but relaxed condition. The present invention, on the other hand, measures the fiber length properties under dynamic conditions, as previously mentioned, in which both crimp permanency and cohesive forces interact to influence the effective staple length. Third, the length parameters as measured by each method are different. The present invention measures the average effective staple length, while the Model 430 Fibrograph, for instance, measures the distance (span length) from the test specimen clamp to a point where only a certain percentage of the clamped fibers extend. The Model 430 Fibrograph does have an optional X-Y recorder output with which an average staple length measurement can be made similar to the present invention. However, as noted above, the staple length is measured by the Fibrograph while the filaments are in a relaxed condition, which is not the same as the dynamic conditions under which the yarn would be drafted by a fiber processor.

In the November, 1974, *Textile Research Journal*, Volume 44, pages 852-855, there is an article entitled "Measurement of Sliver Drafting Forces" by J. S. Olsen of Fiber Surface Research Section, Textile Fibers Department, E. I. du Pont de Nemours and Company, Inc., Kinston, North Carolina, 28501, U.S.A. In this article an apparatus was disclosed by which drafting forces could be measured by using a sensitive watt-meter transducer to measure the power demand of the drafting roll motor. The wattmeter is placed in series with the drafting roll motor electrical supply, since power is a function of force at a fixed roll speed, then wattage becomes a direct measure of drafting force. By use of the disclosure in this Journal article, and modified in the manner disclosed herein, the inventors of the present invention have discovered a number of other parameters can be determined.

Another object of the invention, therefore, is to provide an improved method and apparatus for practicing the method by which parameters of staple length distribution of fibers in a yarn sliver can be readily determined in a relatively short time, as compared to the hand array method, and can also be determined under dynamic conditions as compared to the conditions under the Fibrograph method.

SUMMARY OF THE INVENTION

The improved method, and the apparatus for practicing the method, determine parameters of a staple length distribution of fibers in a yarn sliver by monitoring the drafting force exerted by a yarn sliver while undergoing a continuously changing distance between pairs of drafting rolls. At a distance setting greater than the longest filament (effective staple length) in the yarn sliver, obviously no drafting force (other than the relatively slight force due to fiber-to-fiber cohesion) will occur. As the distance between drafting roll pairs decreases, the longest filaments in the sample will first begin to bridge the gap between the nips of the drafting roll pairs and exert a drafting force. As the distance further decreases, shorter filaments will begin to bridge the gaps and, provided that the fibers are allowed to slip and not break, the longer filaments will remain in the bridged state for a longer period of time. As a consequence, the instantaneous drafting force exerted by the yarn sliver will be a function of both the distance setting and the distribution of filament lengths.

In addition to measuring average effective staple length, the present invention is also capable of measuring the level of "hooks" and "loops" in yarn slivers. Hooks and loops are created in yarn sliver during the carding process. The number of hooks and loops formed is thought to be related to the mechanical condition of the card. A hook or loop in a staple sliver is a filament which is lying substantially parallel with the long axis of the sliver but has one or both ends turned back toward the other end. For example, a fish-hook shape would be a simplified example (see for instance Spinlab Corp., "Test for Hooked Fibers . . . Sliver Clamps and Fibrograph", Information Bulletin 105, October, 1975). Since the hooks are aligned in a particular direction in the card sliver, the direction in which the sliver is run through the apparatus of the present invention can have a significant influence on the measured average effective staple length. Thus, the level of hooks and loops can be estimated by measuring the average effective staple length of the yarn sliver first in one direction and then reversing the sliver end-for-end and running the test again. The ratio of the two measurements is indicative of the level of hooks and loops.

The present invention can also be used to examine crimp permanency. As the yarn sliver is subjected to successive stages of processing, more and more work is done on it. The various initial stages of staple fiber processing (carding and drawing) are concerned with parallelizing or aligning the individual filaments into a uniform strand. At each stage of the operation, depending upon the crimp permanency, more or less crimp is permanently removed from the fiber. The degree of crimp permanency can thus be determined by measuring the average effective staple length at the various stages of processing.

It has also been found that the uniformity of the yarn sliver exiting from the second of the pairs of drafting rolls, or the output draw roll pair, appears to be a strong function of the distance setting between the pairs of drafting rolls. Thus, if the drafted sliver uniformity is measured, perhaps by light transmittance, capacitance, etc., as a function of the distance setting, a measure of optimum distance setting should be obtained.

BRIEF DESCRIPTION OF THE DRAWINGS

In the drawings:

FIG. 6 is a force-time curve for a single fiber passing between the rolls of the apparatus at a fixed distance setting; and FIG. 7 is a graphical showing to aid in mathematical analysis.

DESCRIPTION OF THE PREFERRED EMBODIMENT

Figure 1:
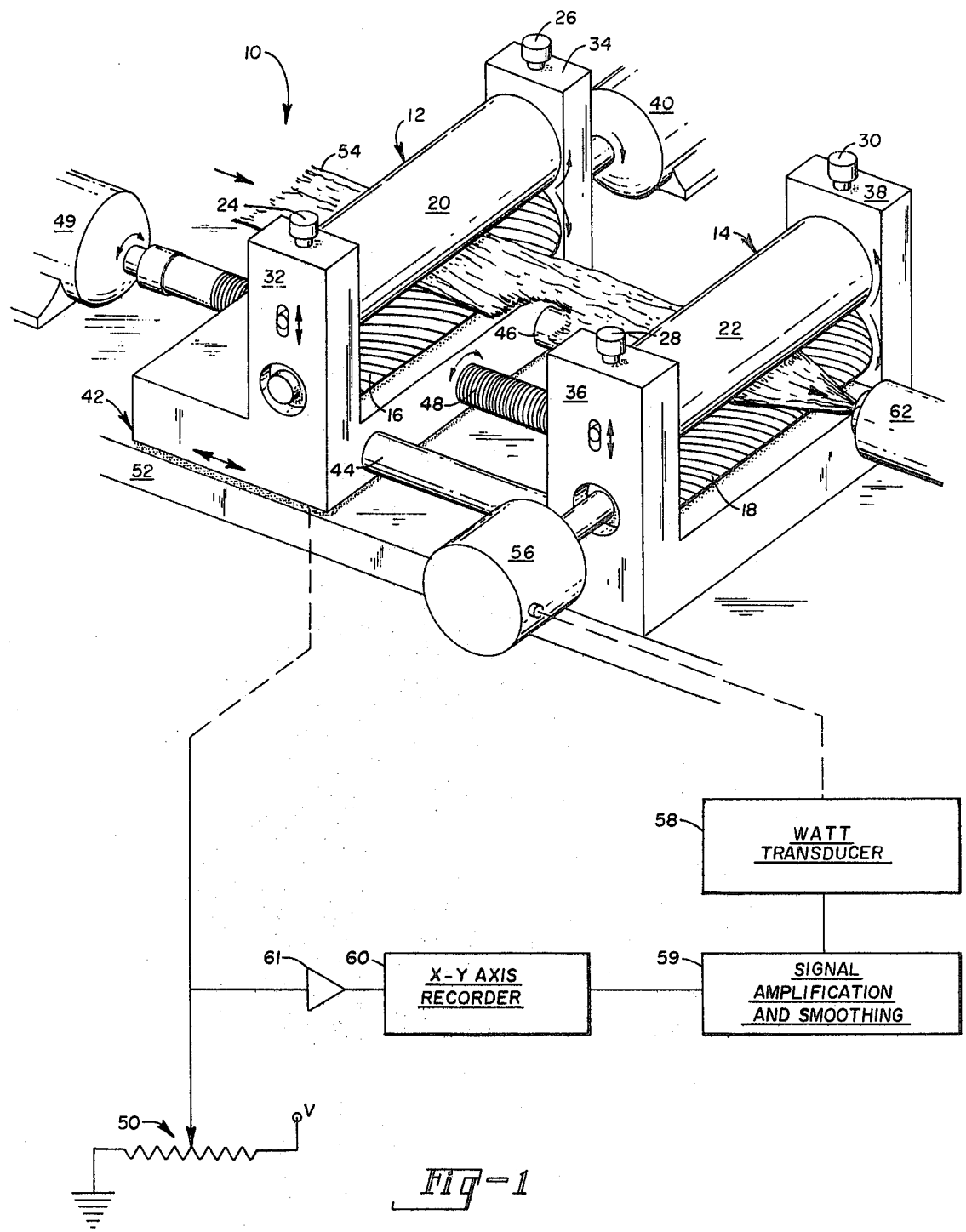
FIG. 1 is a part isometric view of the apparatus for practing the method of this invention and a plan view of a block diagram of the electronic apparatus for providing inputs to an X-Y recorder.

In reference to FIG. 1, the apparatus 10, includes a first pair of drafting rolls 12 and a second pair of drafting rolls 14. Each pair of drafting rolls consists, respectively, of a bottom driven steel roll 16, 18, having shallow helical grooves cut in the surface; and an upper idler steel roll 20, 22, having a rubber cover vulcanized to the steel roll. The roll pressure for each pair is set by means of two screws, respectively, 24, 26, and 28, 30; one screw located at each end of the idler roll mounting respectively, 32, 34 and 36, 38.

The first drafting roll pair (or input roll) 12 and motor 40 for rotating the bottom driven roll thereof are located on a common block 42, which can be moved toward and way from the fixed second pair of drafting rolls 14, thereby varying the distance between the drafting roll pairs. The block 42 may ride by means of linear ball bearings on two parallel steel shafts 44, 46, respectively. The movement of the block may be accomplished by means of a screw thread drive arrangement 48, which may be driven by a 0–60 rpm, 24-volt motor 49. The position of the first pair of drafting rolls may be continuously monitored by a Bournes Model 5194 (Bournes, Inc., Instrument Division, Riverside, Calif.), 8-inch stroke rectilinear potentiometer 50 located beneath the support bench 52 and coupled to the movable block 42. For a nominal 1.5 inch staple yarn, the maximum distance setting between the drafting roll pairs may be about 3 inches, while the minimum distance may be about 1.125 inch. The limits on the distance settings used during testing may be set by means of two microswitches (not shown) located beneath the support bench 52.

Drafting force exerted upon the tested yarn sliver 54 is continuously monitored by measuring the power consumed by the second pair of drafting rolls, such as in the manner disclosed in the previously mentioned November, 1974, *Textile Research Journal,* Volume 44, pages 852–855, "Measurement of Sliver Drafting Forces" by J. S. Olsen, Fiber Surface Research Section, Textile Fibers Department, E. I. du Pont de Nemours and Company, Inc., Kinston, N.C. 28501, U.S.A. As disclosed in the Journal article, the power demand of the drafting roll motor 56 in the present invention may be measured by a sensitive wattmeter transducer 58, which is in series with the drafting roll motor electrical supply (not shown) because power is a function of force at a fixed roll speed, and thus wattage becomes a direct measure of drafting force. The wattmeter transducer 58 shown in FIG. 1 may be a F. W. Bell, Inc., Model EX2203B, 0–15 watt transducer. A 0–50 millivolt DC output signal from the watt transducer then passes through a series of three operational amplifiers. The first amplifier stage is a 10× voltage gain amplifier. The second stage is a fixed 10× voltage gain amplifier with adjustable zero offset, and the third stage is a 0–10× variable gain amplifier. All of the preceding amplifier stages are represented by box 59 in FIG. 1. The resulting signal is fed as an input into both a 0–1000 microamps DC ammeter located on a panel (not shown) for setting roll pressure, to be discussed later, and the Y-axis of a Hewlett-Packard Model 7045A X-Y recorder 60 (Hewlett-Packard, San Diego, Calif).

The rectilinear potentiometer 50, previously mentioned, includes a signal conditioning circuit (not shown) involving a potential divider and a single operational amplifier stage 61 with 0–2× variable gain and zero offset. The resulting signal is fed as an input to the X-axis of the X-Y recorder 60.

The yarn sliver 54 fed to and between the two drafting roll pairs may pass therefrom into an air doff jet shown at 62.

Operation

In operation, the input or first pair of drafting rolls had a speed of 15 rpm and the output or second pair of drafting rolls had a speed of 50 rpm, which gave a draft ratio of 3.33. With the rubber idler rolls unloaded, zero offset controls were adjusted to obtain a meter reading on the microamps DC ammeter (mentioned above but not shown) of 100 microamps, the 100 microamps being arbitrarily selected as a starting point. The two roll loading screws on the output drafting rolls were tightened to give uniform end-to-end loading on the rubber idler roll, such that the yarn sliver will be firmly gripped but will still permit slippage without breaking the fibers. The ammeter meter reading is then noted and recorded for future settings of roll pressure. The input draft roll pressure, on the other hand, is not considered to be critical and is therefore set by "feel" to be approximately that of the output roll pair.

The yarn sliver sample to be tested is now fed through the drafting roll pairs. Then, simultaneously, one of the roll pairs (the input roll pair) is driven toward the other (the output roll pair) and the recording pen is lowered on the X-Y recorder. A curve similar to that shown in FIG. 2 will now be drawn on the X-Y recorder.

Figure 2:
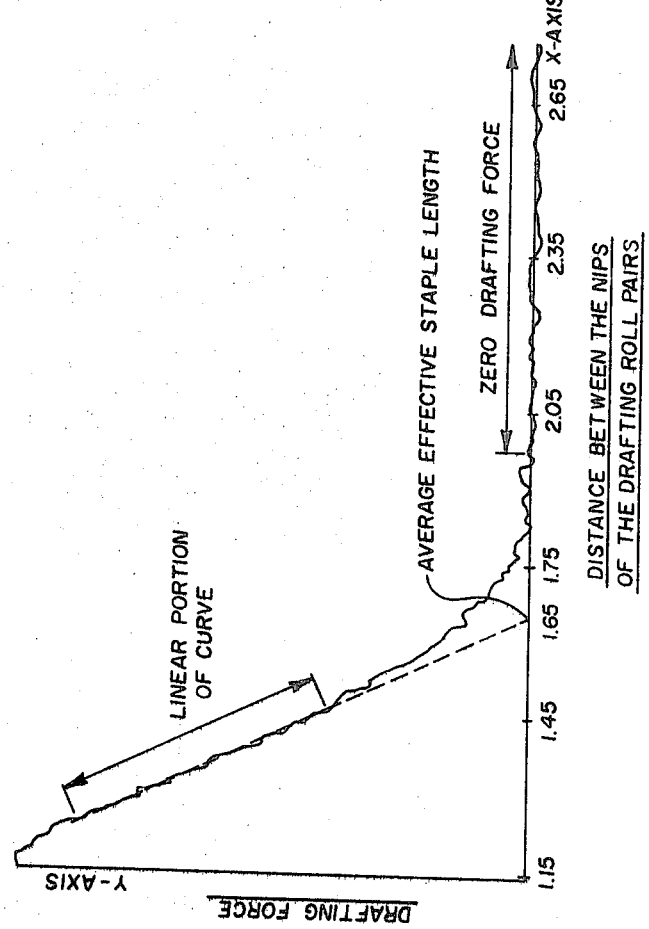
FIG. 2 is a graph illustrating a drafting force curve generated by measurement of a yarn sliver showing drafting force along the Y-axis and distance setting along the X-axis, with a tangential line drawn and the X-coordinate of the intersection of the tangential line with the X-axis determining the average effective staple length of the fibers in the yarn sliver tested.

The average effective staple length, as shown in the graph of FIG. 2, is determined by drawing a straight, tangential line through the linear portion of the ascending portion of the drafting force curve. The X-coordinate of the intersection of this tangential line with the X-axis will be the average effective staple length.

Figure 3:
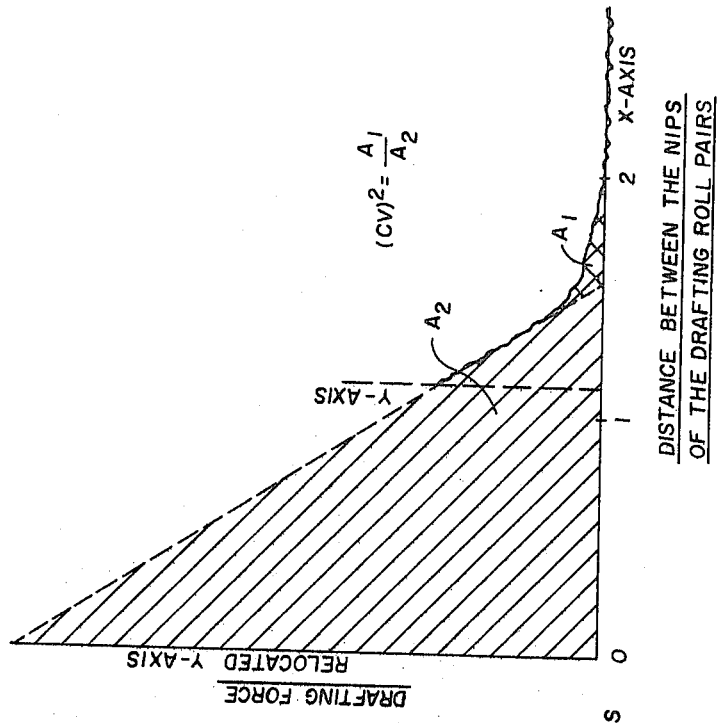
FIG. 3 is a graph similar to that shown in FIG. 2 except that the tangential line has been extended back to zero distance on the X-axis so that the tangential line intercepts with the resulting re-located Y-axis so as to determine the square of the coefficient of variation of the fibers in the yarn sliver tested.

In reference to the graph shown in FIG. 3, the square of the coefficient of variation of the fibers in the yarn sliver tested may be determined in the following manner: The tangential line shown in FIG. 2 is extended back and thus is extrapolated to zero distance on the X-axis between the two pairs of drafting rolls. The intercept of this extended tangential line re-locates the Y-axis. The square of the coefficient of variation is then determined from the ratio of the area $A_1$ between the drawn, extended tangential line and the drafting force curve to the total area $A_2$ under the drafting force curve including the area under the extended tangential line. The percentage coefficient of variation may be found by multiplying the square root of the ratio by 100%.

Figure 4:
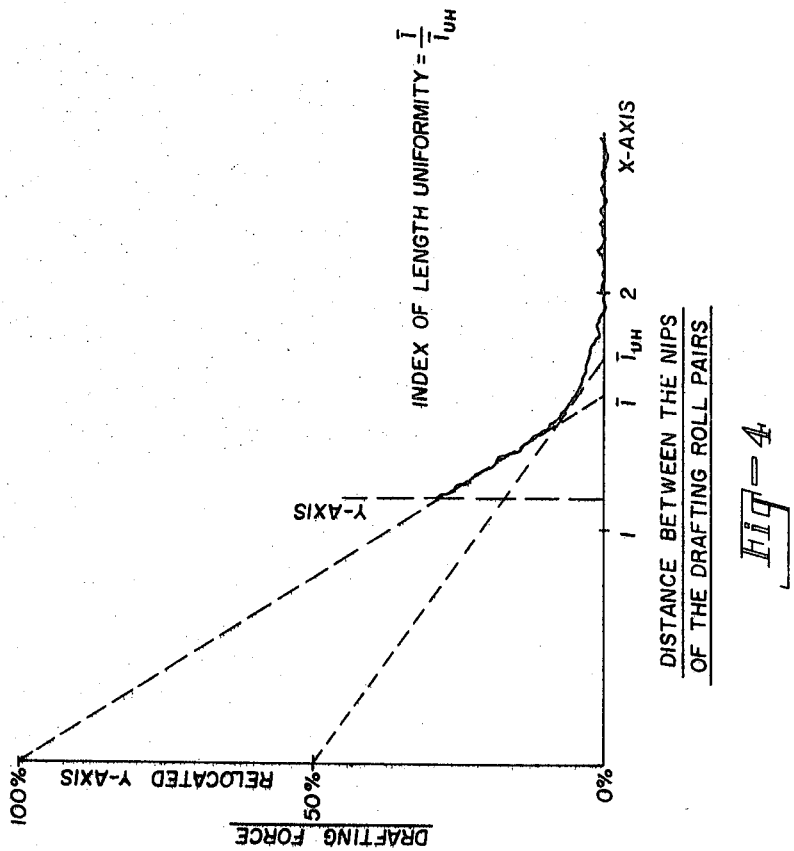
FIG. 4 is a graph similar to that shown in FIG. 3 except that a line has been constructed from the location of the 50% value on the re-located Y-axis to form a tangent with the drafting force curve so as to determine the index of length uniformity of the fibers in the yarn sliver tested.

In reference to the graph shown in FIG. 4, the index of length uniformity of the fibers in the yarn sliver tested may be determined in the following manner: The tangential line is extended, as described with respect to the description of FIG. 3 above. The intercept of the drawn extended tangential line with the resulting re-located Y-axis is given a 100% value. A line is constructed from the location of the 50% value on the re-located Y-axis and a tangent is drawn to the drafting force curve. The intersection of the thus constructed tangential line with the X-axis thereby determines the upper half mean length ($\bar{l}_{uH}$) of the fibers in the yarn sliver. The ratio of the average staple length ($\bar{l}$) to the upper half mean length is the index of length uniformity.

Figure 5:
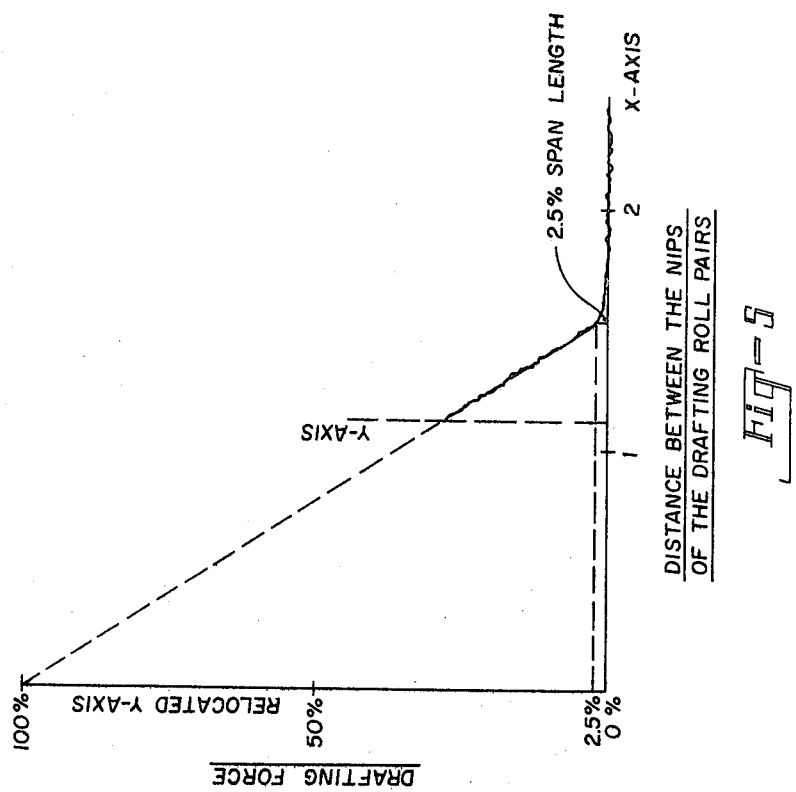
FIG. 5 is a graph similar to that shown in FIG. 3 except that a horizontal line is drawn from the location of the 2.5% value on the re-located Y-axis to intersect with the drafting force curve so as to determine from the X-axis coordinate of such intersection the 2.5% span length of the fibers in the yarn sliver tested.

In reference to the graph shown in FIG. 5, the 2.5% span length of the fibers in the yarn sliver tested is determined in the following manner: The tangential line is extended, as described with respect to the description of FIG. 3 above. The intercept of the drawn extended tangential line with the resulting re-located Y-axis is given a 100% value. A horizontal line is constructed from the location of the 2.5% value on the re-located Y-axis to where the horizontal line intersects with the drafting force curve, thus determining from the X-coordinate of such intersection the 2.5% span length.

Other parameters may also be determined from the drafting force curve, as desired by those skilled in the art to which this invention is directed.

The following discussion shows mathematically the manner in which the average effective staple length is determined from the drafting force curve.

A MATHEMATICAL DESCRIPTION OF THE DRAFTING FORCE CURVE OF A UNIFORM SLIVER

A situation of interest involves using two sets of rolls to draft a uniform sliver. If the sliver is uniform to the extent that each cross sectional slice contains the same number of fibers, then the drafting force measured at a given distance setting will depend primarily upon the number and length of those fibers which are longer than the roll separation, and upon the fiber's stress-strain behavior. To simplify the development of a model, it is helpful to assume that fiber-to-fiber cohesive forces are negligible. This can be shown to be true for the conditions specified in this experiment. Another useful simplification is to assume that the force required to draft a single fiber is constant over the period of time during which the fiber is held between the rolls (call this constant value p). If such is the case, then a force-versus-time curve for a single fiber passing between the rolls at a fixed distance setting will appear as shown in FIG. 6.

The time interval $t_{2i} - t_{1i}$ will depend upon the length of the fiber ($l_i$), the fiber velocity ($v$), and the distance setting ($x$), according to the relation:

$$t_{2i} - t_{1i} = (l_i - x)/v.$$

Over some time period, the average force due to drafting this one fiber will be given by:

$$\bar{f}_i(x) = \frac{\int_0^\tau f_i(t)dt}{\tau} = \frac{p(t_{2i} - t_{1i})}{\tau} = \frac{p\left(\frac{l_i - x}{v}\right)}{\tau} = \frac{p}{\tau v}(l_i - x)$$

If a total of n fibers actually pass between the rolls during this time period, their contributions to the average drafting force curve will be additive so that we can write:

$$\bar{f}(x) = \sum_{i=1}^{n} \bar{f}_i(x) = \sum_{i=1}^{n} \frac{p}{\tau v}(l_i - x)$$

If we have at our disposal the length distribution of the n fibers in terms of class intervals $P(l_i)$, we can rewrite $\bar{f}(x)$ as:

$$\bar{f}(x) = \sum_{i=1}^{m} \left(\frac{p}{\tau v}\right) \cdot P(l_i) \cdot (l_i - x)$$

where $\sum_{i=1}^{m} P(l_i) = n.$

These summations can then be carried over to integrals to yield:

$$\int_0^\infty P(l)dl = n$$

$$\bar{f}(x) = \int_0^\infty \left(\frac{p}{\tau v}\right) \cdot P(l) \cdot (l - x)dl$$

or, noting that $p = 0$ for $l < x$ $$\bar{f}(x) = \int_x^\infty \left(\frac{p}{\tau v}\right) \cdot P(l) \cdot (l - x)dl$$

$$= K \int_x^\infty P(l) \cdot (l - x)dl \text{ where } K = \frac{p}{\tau v}$$

is independent of $x$.

The relationship between $\bar{f}(x)$, the time average value of drafting force at distance setting $x$, and $P(l)$, the fiber length distribution, can be seen more clearly if we examine derivatives of $\bar{f}(x)$.

$$\frac{d}{dx}\bar{f}(x) = \frac{d}{dx}[K \int_x^\infty P(l) \cdot (l - x)dl]$$

$$= K \cdot \frac{d}{dx}[\int_0^\infty P(l) \cdot (l - x)dl - \int_0^x P(l) \cdot (l - x)dl]$$

$$= K[-\int_0^\infty P(l)dl - \frac{d}{dx}(\int_0^x lP(l)dl - \int_0^x xP(l)dl)]$$

$$= K[-\int_0^\infty P(l)dl - xP(x) + \int_0^x P(l)dl + xP(x)]$$

And, $$\frac{d^2}{dx^2}[\bar{f}(x)] = K[P(x)]$$

Note that:

$$\frac{d}{dx}[\bar{f}(x)] = -K \int_0^\infty P(l)dl$$

Thus we can see that the drafting force curve is proportional to the second integral of the fiber length distribution.

The above relations can be used to estimate important parameters of the length distribution. Tangents to $\bar{f}(x)$ are especially interesting. Consider a tangent drawn at an arbitrary point $x_1$ which intersects the X-axis at $x_1'$ as shown in FIG. 7.

We can write the following relations:

$$\bar{f}(x_1) = K \int_{x_1}^\infty P(l)(l - x_1)dl \quad (1)$$

and $$\frac{d}{dx}[\bar{f}(x)]\bigg|_{x = x_1} = -K \int_{x_1}^\infty P(l)dl \quad (2)$$

It is also obvious from the figure that $$\frac{d}{dx}[\bar{f}(x)]\bigg|_{x = x_1} = \frac{-\bar{f}(x_1)}{x_1' - x_1} \quad (3)$$

Combining (2) and (3) gives $$\bar{f}(x_1) = (x_1' - x_1) \cdot K \int_{x_1}^\infty P(l)dl$$

Then the two expressions for $\bar{f}(x_1)$ can be equated to yield an expression for $x_1'$:

$$x_1' = \frac{\int_{x_1}^\infty lP(l)dl}{\int_{x_1}^\infty P(l)dl}$$

This says that $x_1'$ is the mean value of all fibers which are longer than $x_1$. An important special case is obtained by letting $x_1 = 0$. Then, $$x_1' = \frac{\int_0^\infty lP(l)dl}{\int_0^\infty P(l)dl} = \bar{L}$$

This relationship allows us to estimate the mean value of the length distribution by simply finding the x intercept of a tangent drawn at $x = 0$.

The mathematics of drafting force curves is similar in many respects to that used to describe extension distances of fibers in "fibrograms". Treatments of that subject by authors listed in references 1–4 can be paralleled by substituting the drafting force curve for the fibrogram when solving for mean lengths, coefficient of variation of fiber lengths, index of length uniformity, span lengths, etc.

1. Foster, G. A. R., Gregory, J. and Nomersley, J., "Some Calculations Relating to the Arrangement of Fibers in Slivers and Roving", *Journal of the Textile Institute*, 30, T311–T323 (December, 1945).
2. Hertel, K. L., "A Method of Fibre-Length Analysis Using the Fibrograph", *Textile Research Journal*, 10:510–525 (1940).
3. Joshi, V. S., "Measurement of Percent Short Fibers with the Fibrograph", *Textile Research Journal*, 41:71 (January, 1971).
4. Olsen, J. S., "Measurement of Sliver Drafting Forces", *Textile Research Journal*, 852–855 (November, 1974).

The invention has been described in detail with particular reference to certain preferred embodiments thereof, but it will be understood that variations and modifications can be effected within the spirit and scope of the invention.

We claim:

1. An improved method for determining parameters of a staple length distribution of fibers in a yarn sliver wherein an elongate length of yarn sliver is being fed to and through a first pair and a second pair of drafting rolls each spaced apart from each other and the second pair rotating at a greater speed than said first pair, and wherein also a signal representative of the drafting force exerted upon the sliver at any one time is continuously generated and fed as an input of measurement to a recorder; the improved method comprising:
   1. initially spacing the pairs of drafting rolls apart from each other at a distance greater than the longest fiber lengths in said yarn sliver;
   2. then moving one of the pairs of drafting rolls toward the other pair of drafting rolls until first the longer fibers and then the shorter fibers in the yarn sliver extending between said drafting roll pairs bridge the gap between the nips of the two pairs of drafting rolls;
   3. feeding the signal representative of the drafting force to the Y-axis of a X-Y recorder;
   4. continuously measuring the continuing changing distance between the drafting roll pairs and generating as a consequence a signal representative of said continuing changing distance and feeding said signal as an input to the X-axis of said X-Y recorder; and
   5. drawing a drafting force curve representative of said parameters on said X-Y recorder from said Y-axis and X-axis signal inputs.

2. An improved method as defined in claim 1, wherein a tangential line is drawn through the linear portion of the ascending curve, which results from the bridging of the gap by first the longer and then the shorter fibers in said yarn sliver, the X-coordinate of the intersection of the tangential line with the X-axis thereby determining the parameter of average effective staple length of the fibers in the yarn sliver.

3. An improved method as defined in claim 1, wherein a tangential line is drawn through the linear portion of the ascending curve as drawn and as resulting from the bridging of the gap by first the longer and then the shorter fibers in said yarn sliver;
   said tangential line then being extended back and thus extrapolated to zero distance on the X-axis between said two pairs of drafting rolls, said tangential line thus intercepting with the resulting re-located Y-axis; and
   determining the square of the coefficient of variation from the ratio of the area between said drawn, extended tangential line and the drafting force curve to the total area under the drafting force curve including the area under the extended tangential line.

4. An improved method as defined in claim 2, said tangential line then being extended back and thus extrapolated to zero distance on the X-axis between said two pairs of drafting rolls, said tangential line thus intercepting with the resulting re-located Y-axis;
   designating the intercept of the drawn extended tangential line with the re-located Y-axis as 100% value and constructing a line from the location of 50% value on the re-located Y-axis and forming a tangent of said constructed line with the drafting force curve, the intersection of the thus constructed tangential line with the X-axis thereby determining the upper half mean length of the fibers in the yarn sliver, the ratio of the average effective staple length to the upper half mean length being the index of length uniformity.

5. An improved method as defined in claim 2, said tangential line then being extended back and thus extrapolated to zero distance on the X-axis between said two pairs of drafting rolls, said tangential line thus intercepting with the resulting re-located Y-axis;
   designating the intercept of the drawn extended tangential line with the re-located Y-axis as 100% value and constructing a horizontal line from the location of the 2.5% value on the re-located Y-axis to where the horizontal line intersects with the drafting force curve and thereby determining from the X-coordinate of such intersection the 2.5% span length of the fibers in the yarn sliver.

6. Improved apparatus for determining parameters of a staple length distribution of fibers in a yarn sliver being fed through the apparatus, the apparatus including
   a. a recorder;
   b. a first and second pair of drafting rolls, each pair spaced apart from the other pair;
   c. drive means for rotating the first and second pair of drafting rolls with the second pair of drafting rolls being rotated faster than the first pair of drafting rolls; and
   d. means for continuously measuring the drafting force exerted at any one time upon a yarn sliver being fed to and between the two pairs of drafting rolls and generating a signal representative of the measured drafting force at any one time and for feeding said signal as an input to said recorder;

the improved apparatus in combination comprising:
1. means for moving one of the pairs of drafting rolls toward the other pair while a yarn sliver is being fed to and between the two pairs of drafting rolls;
2. said recorder defining a X-Y recorder;
3. means for feeding said drafting force signal to the Y-axis of said X-Y recorder; and
4. means for continuously measuring the continuing changing distance between the two pairs of drafting rolls and generating a signal representative of the continuing changing distance and for feeding the signal as an input to the X-axis of said X-Y recorder;
5. said X-Y recorder including means for drawing a drafting force curve representative of said Y-axis and X-axis signal inputs.

7. Improved apparatus as defined in claim 6, wherein said means for continuously measuring the continuing changing distance between the two pairs of drafting rolls and generating a signal comprises a rectilinear potentiometer and signal conditioning circuit means operatively connected to said rectilinear potentiometer and said X-Y recorder.

* * * * *